(12) United States Patent
Lee et al.

(10) Patent No.: US 7,333,159 B2
(45) Date of Patent: Feb. 19, 2008

(54) LIQUID CRYSTAL DISPLAY DEVICE HAVING FUNCTION OF TEMPERATURE MAINTENANCE

(75) Inventors: Dong Hoon Lee, Gumi-si (KR); Sun Yong Lee, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 456 days.

(21) Appl. No.: 10/959,066

(22) Filed: Oct. 7, 2004

(65) Prior Publication Data

US 2005/0083443 A1    Apr. 21, 2005

(30) Foreign Application Priority Data

Oct. 16, 2003    (KR)    ............. 10-2003-0071986

(51) Int. Cl.
*G02F 1/133*    (2006.01)
(52) U.S. Cl. ............. 349/21; 349/72; 349/199
(58) Field of Classification Search ............. 349/21, 349/72, 199
See application file for complete search history.

(56) References Cited

U.S. PATENT DOCUMENTS

2004/0036834 A1*   2/2004   Ohnishi et al. ............. 349/177

2005/0105009 A1*   5/2005   Dunn et al. ............. 349/21

FOREIGN PATENT DOCUMENTS

| CN | 2323434 | | 6/1999 |
|---|---|---|---|
| JP | 58-91724 | | 6/1983 |
| JP | 58-113017 | | 8/1983 |
| JP | 58-166666 | | 11/1983 |
| JP | 60188928 A | * | 9/1985 |
| JP | 4131829 | | 5/1992 |
| JP | 10049067 | | 2/1998 |

* cited by examiner

*Primary Examiner*—David Nelms
*Assistant Examiner*—(Nancy) Thanh-Nhan P. Nguyen
(74) *Attorney, Agent, or Firm*—McKenna, Long & Aldridge LLP

(57) ABSTRACT

There is provided an LCD (liquid crystal display device) having a function of temperature maintenance. The LCD includes: a liquid crystal panel having a common heating electrode and a temperature detection unit formed in a predetermined region of the liquid crystal panel, for detecting a temperature of the liquid crystal panel and controlling a current applied to the common heating electrode.

14 Claims, 7 Drawing Sheets

LIQUID CRYSTAL DISPLAY DEVICE HAVING FUNCTION OF TEMPERATURE MAINTENANCE

This application claims the benefit of Korean Patent Application No. 2003-71986, filed on Oct. 16, 2003, which is hereby incorporated by reference for all purposes as if fully set forth herein.

BACKGROUND OF THE INVENTION

1. Field of the Invention

The present invention relates to a liquid crystal display device having a function of temperature maintenance.

2. Discussion of the Related Art

With the rapid growth of the information age, displays for processing and displaying information have been developed. Further, to meet current demand for a slim profile, light weight, and low power consumption, flat panel display devices have emerged. Accordingly, a thin film transistor-liquid crystal display device (hereinafter, referred to as a TFT-LCD) having excellent color reproduction capability and slim profile has been developed.

In the LCD, liquid crystal cells are arranged on a liquid crystal panel in matrix form. Light transmittance of the liquid crystal cells are controlled using video data signals provided thereto. Images corresponding to the data signals are displayed on the liquid crystal panel.

Generally, the LCD includes a first substrate (e.g., a TFT substrate) and a second substrate (e.g., a color filter substrate), which are opposite to each other and spaced apart from each other by a predetermined distance. The first substrate includes gate bus lines and data bus lines, which are formed in an inner surface of a transparent substrate in matrix form. Further, TFTs acting as switching elements are formed at crossings between the gate bus lines and the data bus lines, and pixel electrodes connected to drain electrodes of the TFTs are formed at regions defined by the gate lines and the data bus lines.

The second substrate is opposite to the first substrate on which a plurality of pixel electrodes is formed. The second substrate includes a black matrix (BM), a color filter layer, and a common electrode on an inner side of the second substrate.

In the above-described LCD, if one gate bus line and one data bus line are selected and a predetermined voltage is applied thereto, a TFT to which the predetermined voltage is applied is turned on and charges are accumulated at a pixel electrode connected to a drain electrode of the turned-on TFT, so that the arrangement of liquid crystals between the common electrode and the pixel electrode is changed.

The change of arrangement is the basis of operation of the LCD. When an electric field is applied between the two substrates, a twist angle is varied depending on the strength of the electric field and a degree of light transmittance is varied.

In particular, liquid crystal is the most important material used in the LCD and can be used in the range of −40° C. to 90° C. The properties of liquid crystal may fluctuate greatly depending on temperature.

FIG. 1 is a plan view schematically illustrating the LCD according to the related art. As shown in FIG. 1, the LCD of the related art includes a liquid crystal panel 10 in which liquid crystals are injected between two substrates and a drive unit 11 disposed at an outer periphery of the liquid crystal panel 10, for driving the liquid crystal panel 10.

The liquid crystal panel 10 includes pixels arranged between two transparent substrates in matrix form and a switching element (i.e., a TFT) for controlling a signal provided to each of the pixels. Further, a conductive layer 25 is formed at an outer periphery of a seal pattern 13 of the liquid crystal panel 10.

Meanwhile, the drive unit 11 includes a printed circuit board (PCB) on which parts for generating various control signals and data signal are mounted and a drive integrated circuit 12 connected with the liquid crystal panel 10 and the PCB, for applying signals to lines of the liquid crystal panel 10.

Further, the LCD is classified as a chip on glass (COG), a tape carrier package (TCP), and a chip on film (COF) depending on the method for packaging the drive circuit 12 in the liquid crystal panel 10. For example, FIG. 1 illustrates the drive circuit 12 packaged in the liquid crystal panel 10 using the TCP.

FIG. 2 illustrates a cross-sectional view of a region A of FIG. 1. As shown in FIG. 2, the LCD includes a first substrate 21 where TFTs acting as switching elements are formed at crossings between gate lines and data lines and a second substrate 27 facing the first substrate 21 and having a black matrix (BM)/color filter layer 26 and a common electrode 24 on a transparent substrate 22. The LCD further includes a conductive layer 25 formed at an outer periphery between the first and second substrates 21 and 27 and a common electrode voltage line 23 formed on the first substrate 21 and electrically connected with the conductive layer 25.

That is, the conductive layer 25 is formed at the outer peripheral portion between the first and second substrates 21 and 27, and the conductive layer 25 is between the common electrode voltage line 23 and the common electrode 24.

If the common electrode 24 and the common electrode voltage line 23 are electrically connected, the temperature can rise.

However, the increase in temperature due to the conductive layer has limitations. Such limitations may change the operational characteristics of the liquid crystals sensitive to the change in temperature and may cause degradation in an image quality.

SUMMARY OF THE INVENTION

Accordingly, the present invention is directed to a liquid crystal display device having a function of temperature maintenance that substantially obviates one or more problems due to limitations and disadvantages of the related art.

An advantage of the present invention is to provide a liquid crystal display device having a function of temperature maintenance, capable of detecting a temperature of a liquid crystal panel and maintaining a constant temperature, thereby preventing a decreased response time of liquid crystals under a low temperature in driving the LCD due to operational characteristics of the liquid crystals.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and Claims hereof as well as the appended drawings.

To achieve these and other advantages and in accordance with the purpose of the invention, as embodied and broadly described herein, a liquid crystal display device having a function of temperature maintenance includes: a liquid crystal panel having a common heating electrode and a temperature detection unit formed in a predetermined region of the liquid crystal panel, for detecting a temperature of the liquid crystal panel and controlling a current applied to the common heating electrode.

In another aspect of the present invention, there is provided a liquid crystal display device having a function of temperature maintenance, including: a first substrate having TFTs (thin film transistors) acting as switching elements, formed at intersections between gate bus lines and data bus lines, and a temperature detection unit formed at an outer peripheral portion of a region where the TFTs are formed; a second substrate opposite to the first substrate and including a common heating electrode, a BM (black matrix), a color filter layer, and a common electrode; a common voltage line formed at an outer periphery of the first substrate; a conductive layer formed between the common electrode of the second substrate and the common voltage line of the first substrate; a common heating voltage line formed at an outer periphery of the first substrate; and a conductive heating layer formed between the common heating voltage line and the common heating electrode which are respectively formed on the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
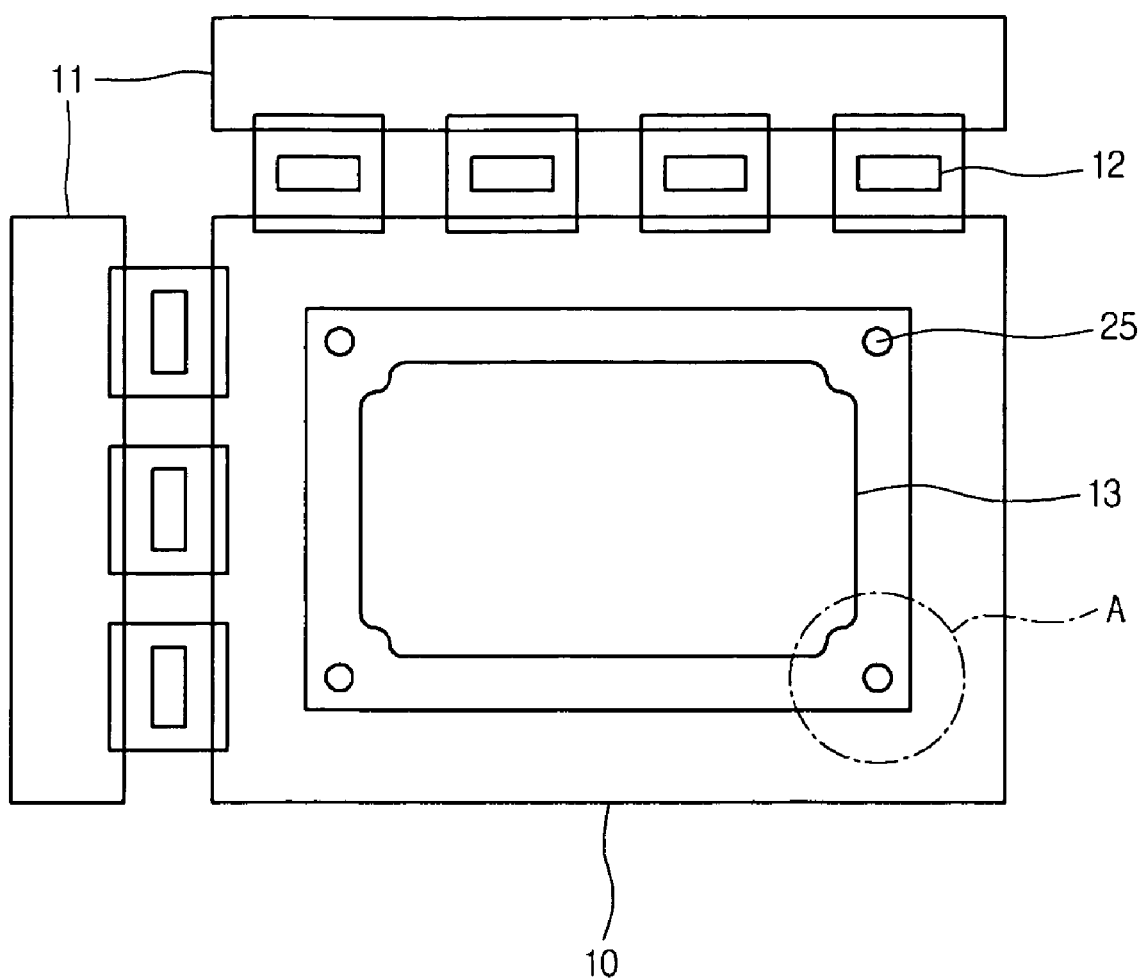
FIG. 1 is a plan view schematically illustrating an LCD according to the related art.
Figure 2:
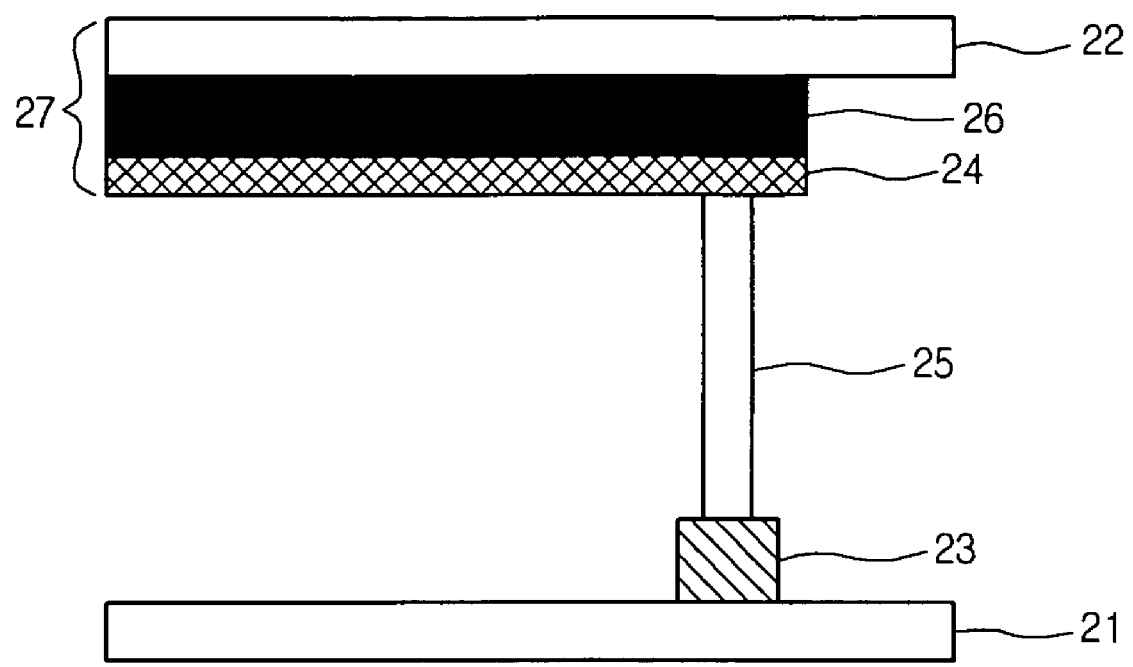
FIG. 2 illustrates an enlarged cross-sectional view of a region A of FIG. 1.
Figure 3:
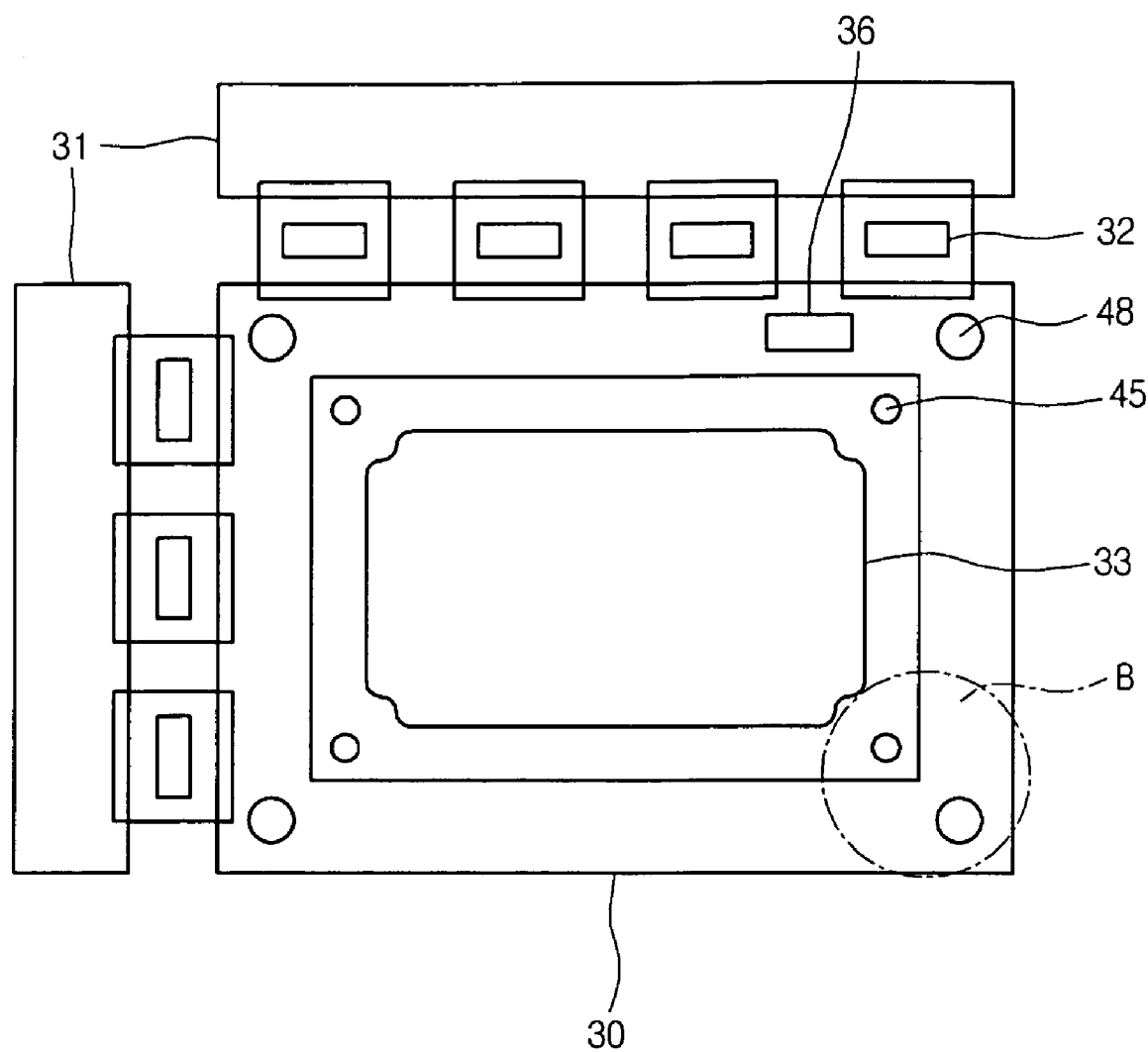
FIG. 3 is a plan view schematically illustrating an LCD having a function of temperature maintenance according to the present invention.

FIG. 3 is a plan view schematically illustrating an LCD having a temperature maintenance function according to the present invention. Referring to FIG. 3, the LCD having a temperature maintenance function according to the present invention includes a liquid crystal panel 30 having a liquid crystal layer interposed between two substrates and a drive unit 31 disposed at an outer periphery of the liquid crystal panel 30, for driving the liquid crystal panel 30.

The liquid crystal panel 30 includes pixels arranged between two transparent substrates in matrix form and a switching element (i.e., a TFT) for controlling a signal provided to each of the pixels.

Further, a conductive layer 45 and a conductive heating layer 48 are formed at an outer periphery of a seal pattern 33 of the liquid crystal panel 30, and a temperature detection unit 36 is formed at a predetermined region on an outer periphery of the liquid crystal panel 30.

The drive unit 31 includes a PCB on which parts for generating various control signals and data signals are mounted and a drive circuit 32 connected with the liquid crystal panel 30 and the PCB for applying signals to lines of the liquid crystal panel 30.

The LCD may be classified as a chip-on-glass (COG), a tape carrier package (TCP), or a chip-on-film (COF) LCD depending on methods for packaging the drive circuit 32 in the liquid crystal panel 30. An example in which the drive circuit 32 is packaged in the liquid crystal panel 10 using the TCP is illustrated in FIG. 3.

Figure 4:
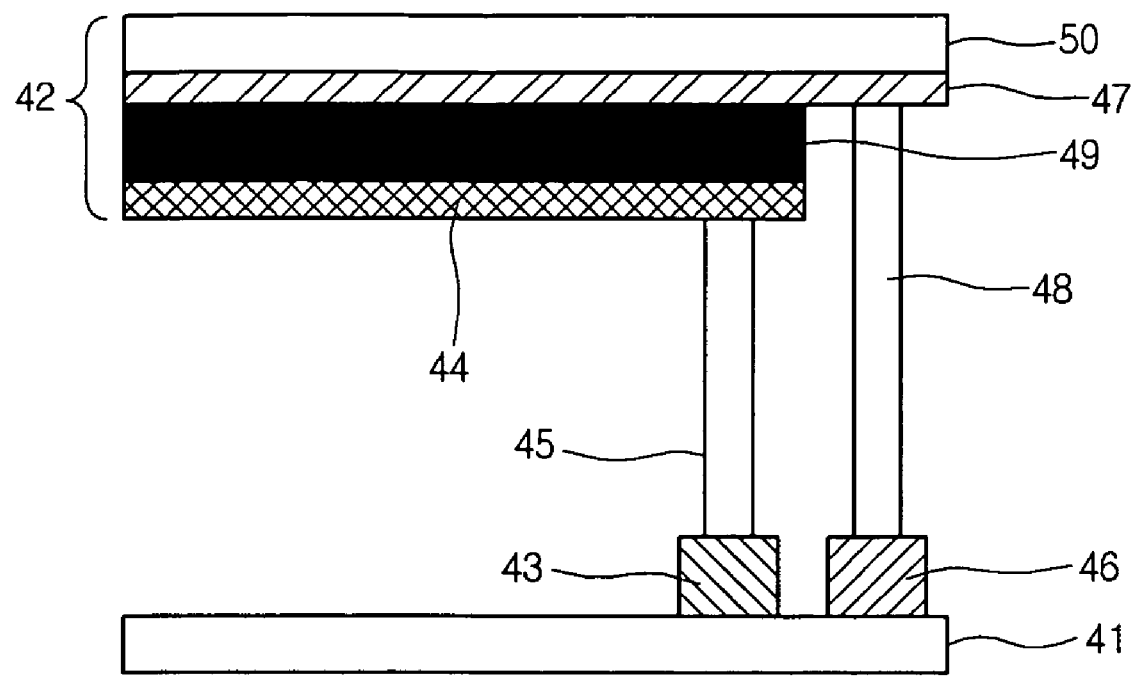
FIG. 4 is a cross-sectional view illustrating a part where a conductive layer for heating is formed in FIG. 3.

FIG. 4 is a cross-sectional view illustrating a region B of FIG. 3 where the conductive heating layer 48 is formed. The LCD according to the present invention includes a first substrate 41 and a second substrate 42.

Gate bus lines (not shown) and data bus lines (not shown) are formed on the first substrate 41, and TFTs (not shown) acting as switching elements are formed at crossings between the gate bus lines and the data bus lines. Also, the temperature detection unit (not shown) is further formed at an outer periphery of the TFTs on the first substrate 41.

The second substrate 42 includes a transparent substrate 50, and a common heating electrode 47, a BM/color filter layer 49, and a common electrode 44 formed on the transparent substrate 50.

The LCD according to the present invention further includes a common electrode voltage line 43 formed at an outer periphery of a liquid crystal cell pattern on the first substrate 41 and a conductive layer 45 formed between the common electrode 44 and the common electrode voltage line 43.

Also, the LCD according to the present invention further includes a common electrode voltage line for heating 46 formed at an outer periphery on the first substrate 41 and a conductive heating layer 48 formed between the common heating electrode voltage line 46 and a common heating electrode for 47.

More specifically, the conductive layer 45 is formed at an outer periphery of a seal pattern between the first substrate 41 and the second substrate 42, and the conductive layer 45 is connected between the common electrode voltage line 43 and the common electrode 44.

The conductive heating layer 48 is formed at an outermost region between the first and second substrates 41 and 42, and the conductive heating layer 48 is connected between the common heating electrode voltage line 46 and the common heating electrode 47. Here, the common heating electrode 47 and the common heating electrode voltage line for 46 are electrically connected together, so that a temperature in an inside of the liquid crystal panel rises.

At least one conductive layer 45 is formed at an edge portion on an outer periphery of the seal pattern of the liquid crystal panel, and at least one conductive layer for heating 48 is formed at an edge portion on an outermost periphery of the liquid crystal panel. Here, the conductive layers 45 and the conductive heating layers 48 may be formed using a silver (Ag) dot or a silver paste, which is able to conduct electricity.

The common heating electrode 47 can be formed of a transparent conductive layer and the transparent conductive layer may be formed of a material selected from the group consisting of indium tin oxide (ITO), indium zinc oxide (IZO), and indium tin zinc oxide (ITZO). The common electrode for heating 47 may be formed on an entire or partial region of the substrate.

The seal pattern is formed so as to perform a bonding process of the first substrate 41 and the second substrate 42, and the liquid crystals are injected in an inside of the seal pattern.

Figure 5:
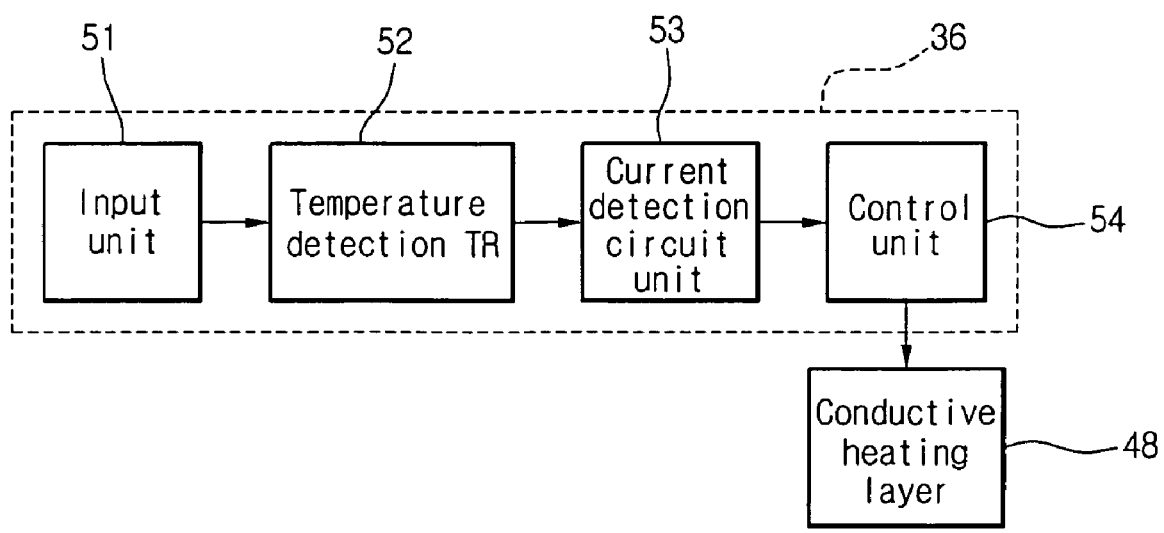
FIG. 5 is a block diagram schematically illustrating a construction of a temperature detection unit according to the present invention.

Meanwhile, FIG. 5 is a block diagram schematically illustrating construction of a temperature detection unit according to the present invention. Referring to FIG. 5, the temperature detection unit 36 according to the present invention includes an input unit 51 for applying a gate voltage and a first data signal, and a temperature detection transistor 52 for receiving the gate voltage and the first data signal and outputting a second data signal according to a temperature. Further, the temperature detection unit 36 according to the present invention includes a current detection circuit unit 53 for receiving the second data signal from the temperature detection transistor 52 and detecting a current value of the varied signal, and a control unit 54 for controlling whether to apply a power source to the conductive heating layer 48 with reference to the temperature corresponding to the detected current value.

If the detected temperature is lower than a set temperature, the temperature detection unit 36 allows a current to flow through the conductive heating layer 48. Accordingly, heat is generated from the common electrode for heating electrically connected with the conductive heating layer 48, so that the temperature of the liquid crystal panel is raised and maintained within a predetermined temperature range.

On the contrary, if the detected temperature is maintained at or higher than the set temperature, the temperature detection unit 36 cuts off a current flowing through the conductive heating layer 48, so that a temperature of the liquid crystal panel can be maintained within a predetermined temperature range.

An operation of the temperature detection unit according to the present invention will now be described in more detail with reference to FIGS. 6 and 7.

Figure 6:
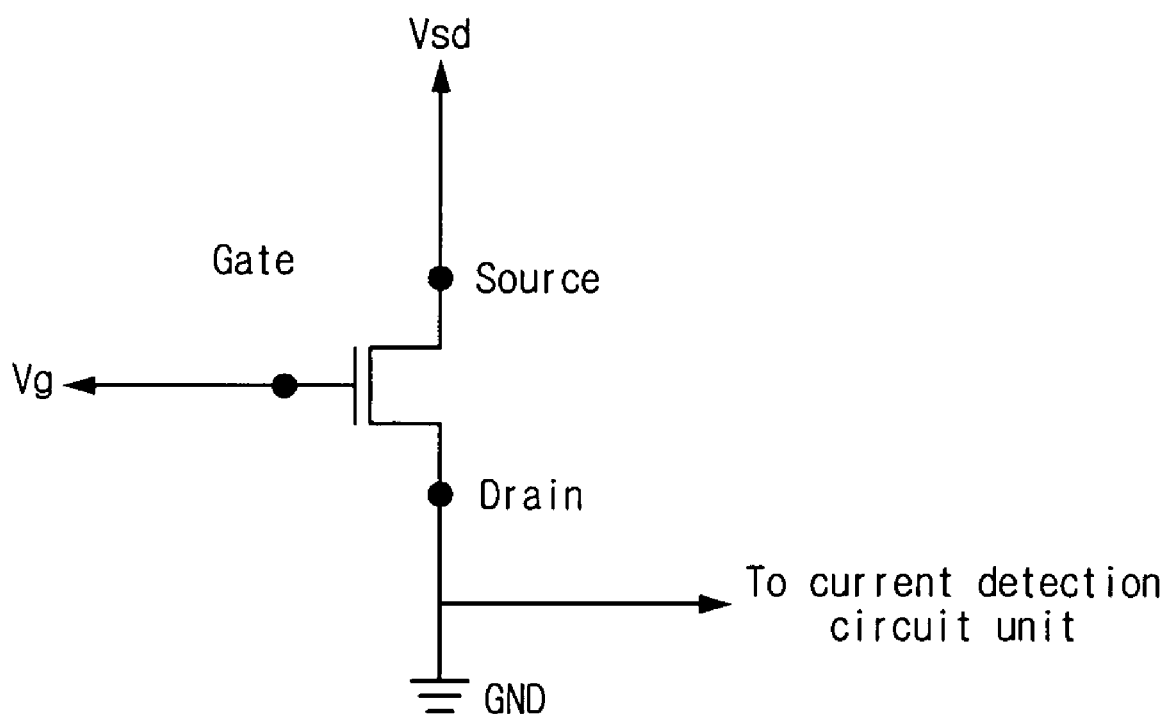
FIG. 6 is a view illustrating temperature detection transistor according to the present invention.

FIG. 6 is a view of a temperature detection transistor according to an embodiment of the present invention. Referring to FIG. 6, the temperature detection transistor 52 can be formed inside the temperature detection unit formed at the outer periphery on the liquid crystal panel. When the temperature detection transistor 52 provides a drain current to the current detection circuit unit 53, a temperature of the liquid crystal panel is measured.

More specifically, a current of the first data signal is input from the input unit 51 to the temperature detection transistor 52 and output as the second data signal by a gate voltage of the temperature detection transistor 52. At this point, if the gate voltage is constant, a current value of the second data signal of the temperature detection transistor 52 is varied due to the first data signal according to a temperature change.

At this point, the temperature detection transistor 52 can be driven in response to one signal provided by short-circuiting the first data signal and the gate voltage.

Therefore, a change in temperature of the liquid crystal panel can also be detected through the detection of the change in a current of the second data signal.

Figure 7:
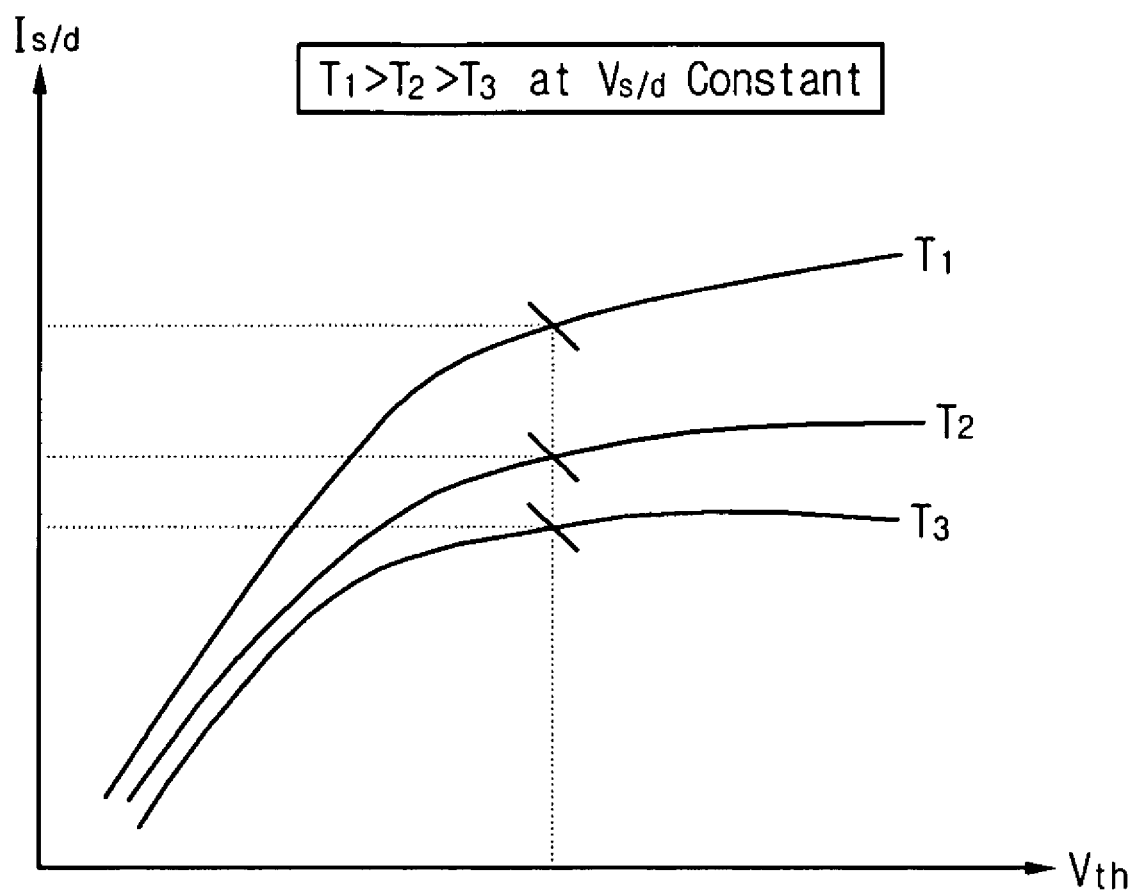
FIG. 7 is a graph illustrating current-voltage characteristics depending on a change in temperature of a temperature detection transistor according to the present invention.

FIG. 7 is a graph illustrating a current-voltage characteristics depending on the change in temperature of the temperature detection transistor according to the present invention. Referring to FIG. 7, a desired waveform can be obtained by controlling a ratio of width to length between source and drain.

It can be seen that Is/d at the same voltage value increases as a temperature is raised, and it is possible to deduce the change in temperature of the liquid crystal panel by detecting a current variation caused by that temperature change.

Therefore, the control unit 54 measures a temperature corresponding to a current value detected by the current detection circuit unit 53. If the measured temperature is lower than a predetermined temperature, the control unit 54 applies a current to the conductive heating layer 48 so as to provide a temperature for maintaining a response time of liquid crystals. Accordingly, the temperature of the liquid crystal panel can be maintained within a predetermined temperature range.

As described above, the LCD having a function of temperature maintenance according to the present invention can detect a temperature of the liquid crystal panel and maintain a constant temperature, thereby preventing the response time of the liquid crystal from decreasing under a lower temperature due to the operational characteristics of the liquid crystal in driving the LCD.

It will be apparent to those skilled in the art that various modifications and variations can be made in the present invention. Thus, it is intended that the present invention covers the modifications and variations of this invention provided they come within the scope of the appended Claims and their equivalents. It will be apparent to those skilled in the art that various modifications and variation can be made in the present invention without departing from the spirit or scope of the invention. Thus, it is intended that the present invention cover the modifications and variations of this invention provided they come within the scope of the appended Claims and their equivalents.

What is claimed is:

1. A LCD (liquid crystal display device) comprising:
   a liquid crystal panel having a common heating electrode;
   a temperature detection unit in a predetermined region of the liquid crystal panel detecting a temperature of the liquid crystal panel and controlling a current applied to the common heating electrode; and
   a conductive heating layer, prepared at an outer periphery of the liquid crystal panel, allowing a current to flow from the temperature detection unit to the common heating electrode.

2. The LCD according to claim 1, wherein the temperature detection unit comprises:
   a temperature detection transistor receiving a gate voltage and a first data signal and outputting a second data signal depending on a change in temperature;
   a current detection circuit unit for receiving the second data signal from the temperature detection transistor and detecting a current value of the second data signal; and
   a control unit for computing a temperature from the current value detected by the current detection circuit unit and controlling a current applied to the common heating electrode with reference to the computed temperature.

3. The LCD according to claim 2, wherein the control unit controls the current applied to the common heating electrode depending on the computed temperature so as to maintain a response time of a liquid crystal.

4. The LCD according to claim 2, wherein the temperature detection transistor provides a different current value depending on a change in temperature.

5. The LCD according to claim 1, wherein the common heating electrode is at an upper substrate of the liquid crystal panel.

6. The LCD according to claim 1, wherein the conductive heating layer is formed of silver (Ag).

7. The LCD according to claim 1, wherein the common heating electrode is formed of a transparent conductive layer.

8. The LCD according to claim 7, wherein the transparent conductive layer is a material selected from a group consisting of ITO (indium tin oxide), IZO (indium zinc oxide), and ITZO (indium tin zinc oxide).

9. A LCD (liquid crystal display device) comprising:
- a first substrate including: TFTs (thin film transistors) acting as switching elements, formed at crossings of gate bus lines and data bus lines; and a temperature detection unit formed at an outer peripheral portion of a region where the TFTs are formed;
- a second substrate opposite to the first substrate and including a common heating electrode, a BM (black matrix), a color filter layer, and a common electrode;
- a common voltage line formed at an outer periphery of the first substrate;
- a conductive layer formed between the common electrode of the second substrate and the common voltage line of the first substrate;
- a common heating voltage line at an outer periphery of the first substrate; and
- a conductive heating layer between the common heating voltage line and the common heating electrode which are respectively formed on the first substrate and the second substrate.

10. The LCD according to claim 9, wherein the temperature detection unit comprises a temperature detection transistor.

11. The LCD according to claim 9, wherein the temperature detection unit comprises:
- a temperature detection transistor for receiving a gate voltage and a first data signal and outputting a second data signal depending on a temperature change;
- a current detection circuit unit for receiving the second data signal from the temperature detection transistor and detecting a current value corresponding to the second data signal; and
- a control unit for computing a temperature from the current value detected by the current detection circuit unit and controlling a current applied to the common heating electrode with reference to the computed temperature.

12. The LCD according to claim 9, wherein the common heating electrode is formed of a transparent conductive layer.

13. The LCD according to claim 12, wherein the transparent conductive layer is a material selected from a group consisting of ITO (indium tin oxide), IZO (indium zinc oxide), and ITZO (indium tin zinc oxide).

14. The LCD according to claim 9, wherein the conductive heating layer is formed of silver (Ag).

* * * * *